(12) United States Patent
Shiotani et al.

(10) Patent No.: US 11,394,161 B2
(45) Date of Patent: Jul. 19, 2022

(54) ROTARY CONNECTOR DEVICE

(71) Applicants: FURUKAWA ELECTRIC CO., LTD., Tokyo (JP); FURUKAWA AUTOMOTIVE SYSTEMS INC., Inukami-gun (JP)

(72) Inventors: Yoshihiro Shiotani, Inukami-gun (JP); Yoji Tajiri, Inukami-gun (JP); Hayato Arakawa, Inukami-gun (JP)

(73) Assignees: FURUKAWA ELECTRIC CO., LTD., Tokyo (JP); FURUKAWA AUTOMOTIVE SYSTEMS INC., Shiga (JP)

( * ) Notice: Subject to any disclaimer, the term of this patent is extended or adjusted under 35 U.S.C. 154(b) by 0 days.

(21) Appl. No.: 17/213,227

(22) Filed: Mar. 26, 2021

(65) Prior Publication Data
US 2021/0218208 A1    Jul. 15, 2021

Related U.S. Application Data

(63) Continuation of application No. PCT/JP2019/039168, filed on Oct. 3, 2019.

(30) Foreign Application Priority Data

Oct. 5, 2018  (JP) .............................. JP2018-190244

(51) Int. Cl.
*H01R 3/00*   (2006.01)
*H01R 35/02*  (2006.01)
(Continued)

(52) U.S. Cl.
CPC ........... *H01R 35/025* (2013.01); *H02G 11/00* (2013.01); *B60R 16/027* (2013.01)

(58) Field of Classification Search
CPC ........................... B06R 16/027; H01R 35/025
See application file for complete search history.

(56) References Cited

U.S. PATENT DOCUMENTS 4,836,795 A * 6/1989 Schauer ................. H02G 11/00
                                                      439/15
5,046,951 A * 9/1991 Suzuki .................. B60R 16/027
                                                      439/15
(Continued)

FOREIGN PATENT DOCUMENTS

CN       101399423       4/2009
CN       103378526      10/2013
(Continued)

OTHER PUBLICATIONS

Extended European Search Report for corresponding EP Application No. 19870015.5-1201, dated Oct. 18, 2021.
(Continued)

*Primary Examiner* — Phuong Chi Thi Nguyen
(74) *Attorney, Agent, or Firm* — Mori & Ward, LLP (57) ABSTRACT

A rotary connector device includes a fixed body, a rotation body, a connector, and an electrode. The connector is coupled to the fixed body and includes a second space and a cable cutting member in the second space which is in communication with the first space. The electrode is provided in the second space of the connector. An exposed conductor portion provided at one end of a cable is connected to the electrode. The cable extends from the second space to the first space. The other end of the cable is connected to the rotation body. The cable cutting member is configured to cut the cable before the exposed conductor portion connected to the electrode of the connector is disconnected when the cable is pulled due to rotation of the rotation body.

9 Claims, 10 Drawing Sheets

(51) Int. Cl.
*H02G 11/00* (2006.01)
*B60R 16/027* (2006.01)

(56) References Cited

U.S. PATENT DOCUMENTS

| | | | | |
|---|---|---|---|---|
| 5,226,230 | A | * 7/1993 | Klinger | ............ B25B 27/10 |
| | | | | 285/308 |
| 5,286,219 | A | 2/1994 | Uno et al. | |
| 5,429,517 | A | 7/1995 | Bolen | |
| 6,007,355 | A | * 12/1999 | Shibata | ............ B60R 16/027 |
| | | | | 439/15 |
| 7,190,385 | B2 | * 3/2007 | Van Uffel | ............ B41J 2/365 |
| | | | | 347/188 |
| 2008/0057741 | A1 | 3/2008 | Inotsuka | |

FOREIGN PATENT DOCUMENTS

| | | |
|---|---|---|
| CN | 106159621 | 11/2016 |
| CN | 107342518 | 11/2017 |
| EP | 1892158 | 2/2008 |
| EP | 2676850 | 12/2013 |
| JP | 05-45978 U | 6/1993 |
| JP | 07-263103 | 10/1995 |
| JP | 2000-306649 | 11/2000 |
| JP | 2004-222369 | 8/2004 |
| JP | 2012-204057 | 10/2012 |
| JP | 2013-219862 | 10/2013 |

OTHER PUBLICATIONS

Written Opinion for corresponding International Application No. PCT/JP2019/039168, dated Nov. 12, 2019.
International Search Report for corresponding International Application No. PCT/JP2019/039168, dated Nov. 12, 2019.
European Office Action for corresponding EP Application No. 19870015.5-1201, dated Feb. 18, 2022.
Chinese Office Action for corresponding CN Application No. 201980062891.4, dated Feb. 28, 2022 (w/ English machine translation).

* cited by examiner

ROTARY CONNECTOR DEVICE

CROSS-REFERENCE TO RELATED APPLICATIONS

The present application is a continuation application of International Application No. PCT/JP2019/039168, filed Oct. 3, 2019, which claims priority to Japanese Patent Application No. 2018-190244 filed Oct. 5, 2018. The contents of these applications are incorporated herein by reference in their entirety.

BACKGROUND

Technical Field

The technology disclosed in the present application relates to a rotary connector device.

Background Art

A known rotary connector device includes: a fixed body, a rotation body that is rotatably attached to the fixed body, a connector connected to the fixed body, and a cable placed in a space between the fixed body and the rotation body (e.g., see Japanese Unexamined Patent Application Publication No. 2004-222369). In the rotary connector device described in Japanese Unexamined Patent Application Publication No. 2004-222369, one end of the cable is connected to the fixed body, and the other end of the cable is connected to the rotation body.

SUMMARY

According to one aspect of the present application, a rotary connector device includes a fixed body, a rotation body, a connector, and an electrode. The rotation body is rotatable about a rotation axis with respect to the fixed body. The rotation body is assembled to the fixed body in a manner to form a first space between the rotation body and the fixed body. The connector is coupled to the fixed body and includes a second space and a cable cutting member in the second space which is in communication with the first space. The electrode is provided in the second space of the connector. An exposed conductor portion provided at one end of a cable is connected to the electrode. The cable extends from the second space to the first space. The other end of the cable is connected to the rotation body. The cable cutting member is configured to cut the cable before the exposed conductor portion connected to the electrode of the connector is disconnected when the cable is pulled due to rotation of the rotation body.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Hereinafter, embodiments will be described with reference to the drawings. In the figures, the same reference signs denote corresponding or identical components.

Outline of Rotary Connector Device

Figure 1:
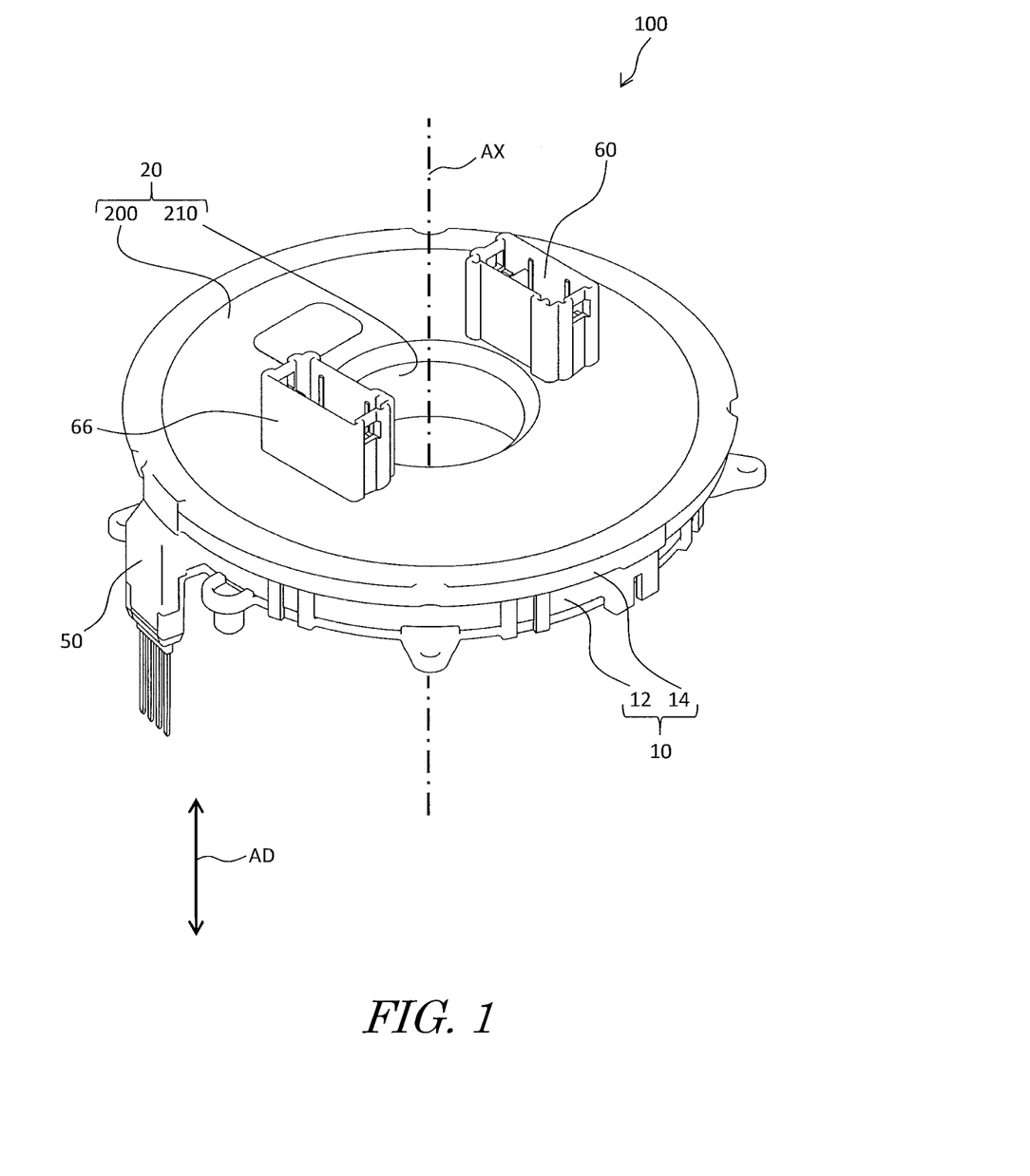
FIG. 1 is a perspective view of a rotary connector device according to an embodiment.
Figure 2:
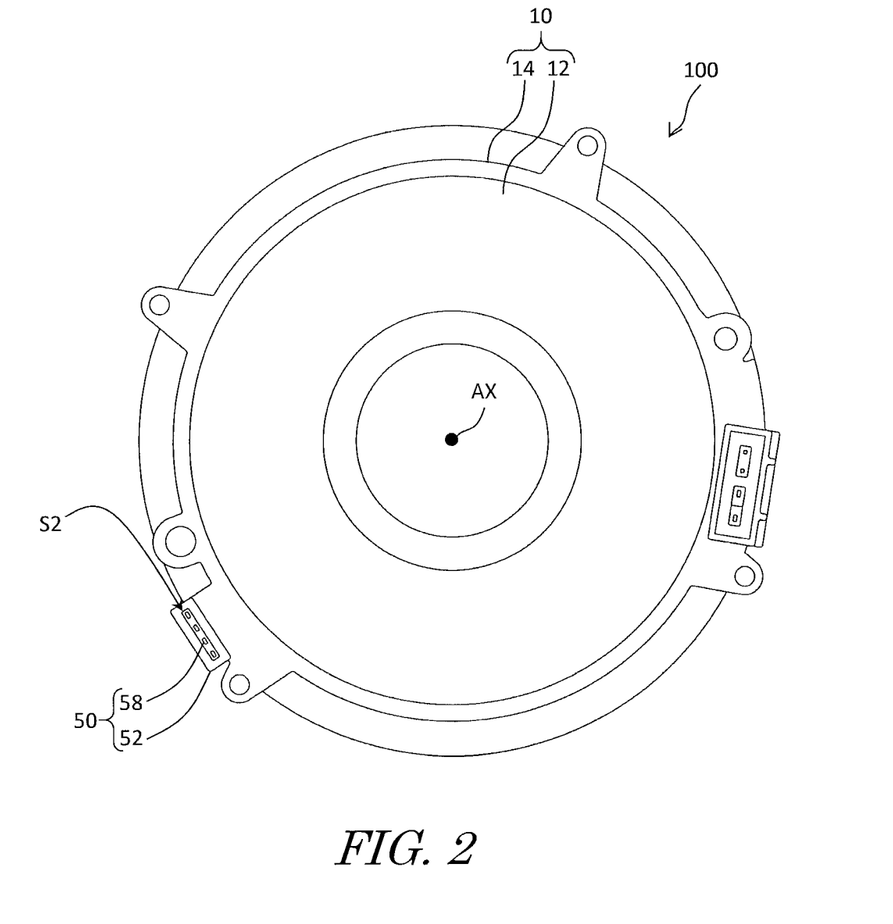
FIG. 2 is a bottom view of the rotary connector device.
Figure 3:
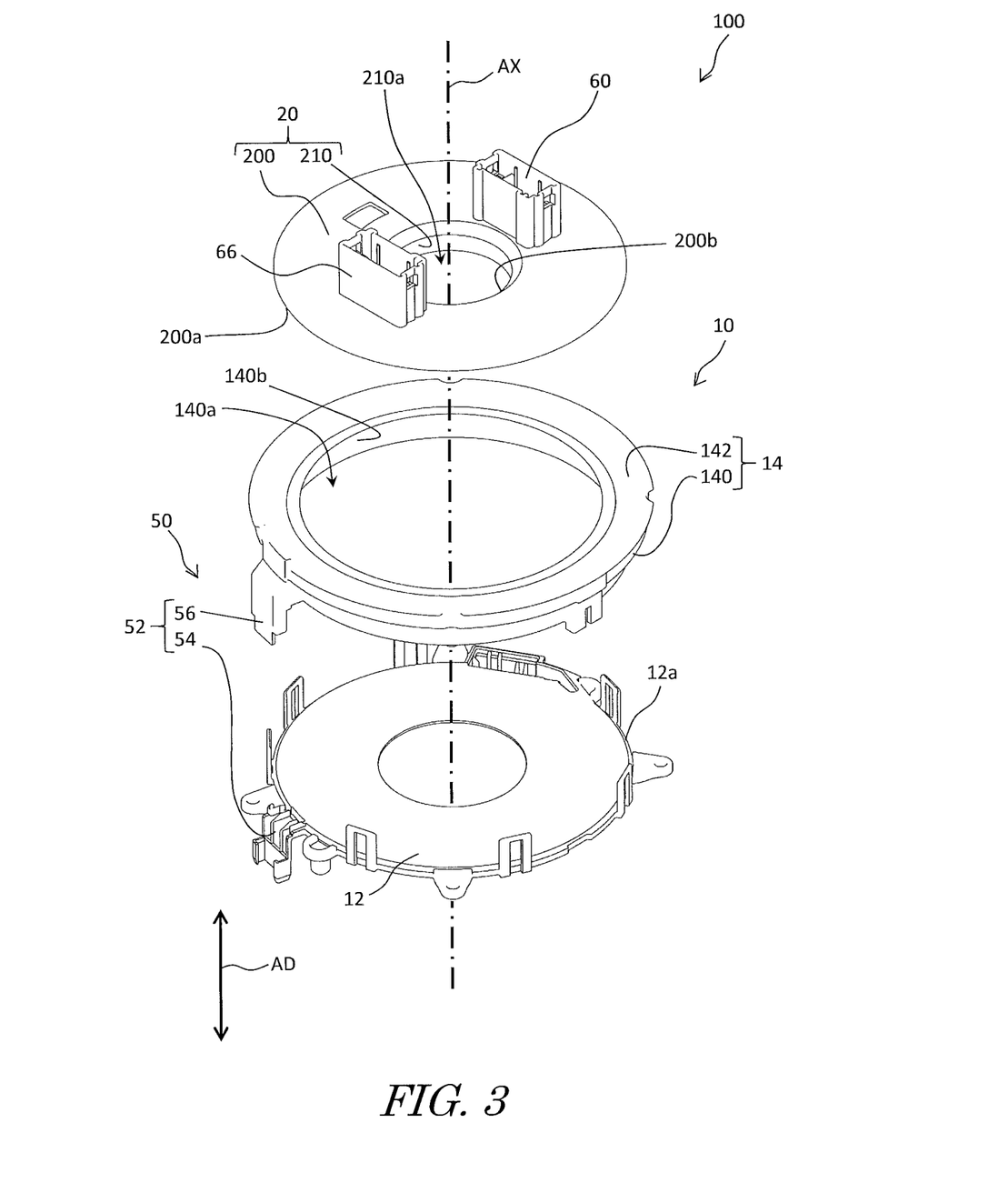
FIG. 3 is a perspective view in which a fixed body is removed from a rotation body and the fixed body is disassembled into a first fixed body portion and a second fixed body portion.

FIG. 1 is a perspective view of a rotary connector device 100 according to an embodiment. FIG. 2 is a bottom view of the rotary connector device 100. FIG. 3 is a perspective view in which a fixed body 10 is removed from a rotation body 20 and the fixed body 10 is disassembled into a first fixed body portion 12 and a second fixed body portion 14.

As illustrated in FIGS. 1 to 3, the rotary connector device 100 includes the fixed body 10 and the rotation body 20. The rotation body 20 is assembled to the fixed body 10 so as to be rotatable with respect to the fixed body 10 around a rotation axis AX. In a state where the rotation body 20 is assembled to the fixed body 10, a first space S1 (see FIGS. 5 to 8) is defined between the fixed body 10 and the rotation body 20.

A cable 30 is disposed in the first space S1. A first end 30a of the cable 30 is connected to the fixed body 10. A second end 30b of the cable 30 is connected to the rotation body 20.

The rotary connector device 100 is used in, for example, a moving body (e.g., an automobile) including a main body and a steering portion rotatable with respect to the main body. Specifically, the fixed body 10 is attached to the main body of the moving body. The rotation body 20 is attached to a steering portion. The first end 30a of the cable 30 is electrically connected to each electrical device provided in the main body of the moving body. The second end 30b of the cable 30 is electrically connected to electrical devices (e.g., a switch) provided in the steering portion. Thus, the rotary connector device 100 transmits and receives electric power or an electric signal between an electrical device provided in the main body of the moving body and an electrical device provided in the steering portion. However, the rotary connector device 100 may be used in a device other than the moving body.

Configuration of Fixed Body

As illustrated in FIGS. 1 and 3, the fixed body 10 includes the first fixed body portion 12 and the second fixed body portion 14. The second fixed body portion 14 is coupled to the first fixed body portion 12 in a state of being disposed on the first fixed body portion 12.

As illustrated in FIG. 3, the first fixed body portion 12 has a ring shape when the rotary connector device 100 is viewed in an axial direction AD substantially parallel to the rotation axis AX. The first fixed body portion 12 is disposed such that the rotation axis AX passes through the center of the first fixed body portion 12.

The second fixed body portion 14 includes an outer-circumferential cylindrical portion 140 and an inner flange portion 142. The outer-circumferential cylindrical portion 140 has a cylindrical shape in which a hollow portion 140a of the outer-circumferential cylindrical portion 140 extends in the axial direction AD. The outer-circumferential cylindrical portion 140 extends upward from an outer periphery 12a of the first fixed body portion 12 in the axial direction AD. The inner flange portion 142 extends from an inner peripheral surface 140b of the outer-circumferential cylindrical portion 140 in the radial direction of the rotation axis AX.

Configuration of Rotation Body

The rotation body 20 includes an annular member 200 and an inner-circumferential cylindrical portion 210. The annular member 200 has a ring shape when the rotary connector device 100 is viewed in the axial direction AD. The annular member 200 is disposed such that the rotation axis AX passes through the center of the annular member 200. The annular member 200 is disposed such that an edge 200a of a bottom surface of the annular member faces the inner flange portion 142 in the axial direction AD. The inner-circumferential cylindrical portion 210 is disposed such that a hollow portion 210a of the inner-circumferential cylindrical portion 210 extends in the axial direction AD. The inner-circumferential cylindrical portion 210 extends downward from an inner periphery 200b of the annular member 200 along the axial direction AD. The inner-circumferential cylindrical portion 210 is disposed inside the outer-circumferential cylindrical portion 140 having a cylindrical shape in the radial direction of the rotation axis AX. Thus, the first space S1 in which the cable 30 is disposed is composed of the first fixed body portion 12, the outer-circumferential cylindrical portion 140, the annular member 200, and the inner-circumferential cylindrical portion 210. In other words, the first space S1 in which the cable 30 is disposed is equal to a space obtained by excluding the hollow portion 210a of the inner-circumferential cylindrical portion 210 from the hollow portion 140a of the outer-circumferential cylindrical portion 140.

In the present embodiment, the inner-circumferential cylindrical portion 210 is provided in the rotation body 20. However, in order to define the first space S1, the inner-circumferential cylindrical portion 210 may be provided in the fixed body 10. Further, in the present embodiment, the rotary connector device 100 has the shape having the hollow portion 210a, but the rotary connector device 100 may not have the hollow portion 210a.

Configuration of Cable

Figure 4:
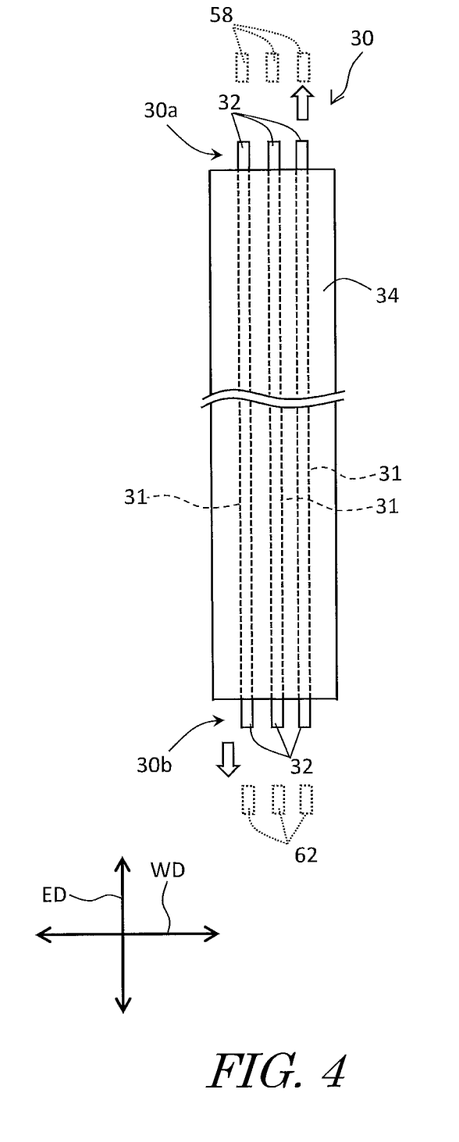
FIG. 4 is a diagram illustrating a configuration of a cable.

FIG. 4 is a diagram illustrating a configuration of the cable 30. The cable 30 has flexibility. The cable 30 has a flat shape. The cable 30 includes a plurality of conductors 31 and a covering member 34 covering the plurality of conductors 31 and having insulating properties. The plurality of conductors 31 and the covering member 34 have a shape extending in one direction. For example, the conductor 31 is made of a film of copper the thickness of which is equal to or less than 1 mm. For example, the covering member 34 is made of resin (e.g., soft vinyl chloride). However, the materials of the conductor 31 and the covering member 34 are not limited thereto as long as the cable 30 has flexibility.

The conductor 31 is exposed from the covering member 34 at the first end 30a and the second end 30b of the cable 30. That is, the conductor 31 has exposed conductor portions 32 provided at the first end 30a and the second end 30b of the cable 30. The cable 30 is wound along the inner peripheral surface 140b of the outer-circumferential cylindrical portion 140 in the first space S1.

In the example illustrated in FIG. 4, three conductors 31 are provided in the cable 30, but the number of conductors 31 is not limited thereto. The rotary connector device 100 may further include a cable different from the cable 30.

Configuration of Connector

As illustrated in FIG. 1, the rotary connector device 100 includes a connector 50 on the fixed body 10 side, a connector 60 on the rotation body 20 side, and a connector 66 on the rotation body 20 side. However, the connector 66 on the rotation body 20 side may be omitted.

As illustrated in FIGS. 1 and 2, the connector 50 has a second space S2 inside and is coupled to the fixed body 10. As illustrated in FIG. 2, the connector 50 includes a cover 52 and an electrode 58. As illustrated in FIG. 3, the cover 52 includes a first cover portion 54 and a second cover portion 56. As illustrated in FIG. 3, the first cover portion 54 extends downward in the axial direction AD and outward of the first fixed body portion 12 in the radial direction of the rotation axis AX from a part of the outer periphery 12a of the first fixed body portion 12. The second cover portion 56 extends downward in the axial direction AD and outward of the outer-circumferential cylindrical portion 140 in the radial direction of the rotation axis AX from a part of the outer-circumferential cylindrical portion 140. The first fixed body portion 12 and the second fixed body portion 14 are coupled to each other, and the first cover portion 54 and the second cover portion 56 are coupled to each other, thereby forming the second space S2. The second space S2 is open downward in the axial direction AD. However, the shape of the cover 52 is not limited thereto. For example, the cover 52 may have a cylindrical shape that extends outward from the outer-circumferential cylindrical portion 140 in the radial direction of the rotation axis AX and opens an internal space in the radial direction of the rotation axis AX.

As illustrated in FIG. 2, the electrode 58 is disposed in the cover 52 in the second space S2. That is, the electrode 58 is covered with the cover 52. An exposed conductor portion 32 is exposed from the covering member 34 at the first end 30a of the cable 30. The exposed conductor portion 32 of the conductor 31 is connected to the electrode 58 in the second space S2 (see FIG. 6). Each of the plurality of electrodes 58 has a terminal portion, and the terminal portion is connected to a terminal of a cable connected to a controller provided in a main body of the moving body. However, the terminal portion may be electrically connected to the electrode 58, and the terminal portion and the electrode 58 may be provided separately.

The connector 60 is coupled to the annular member 200. The connector 60 includes electrodes 62 (see FIG. 4) and a cover that covers the electrodes 62. The exposed conductor portion 32 exposed from the covering member 34 at the second end 30b of the cable 30 is connected to the electrodes 62 of the connector 60.

Arrangement of Cable

Figure 5:
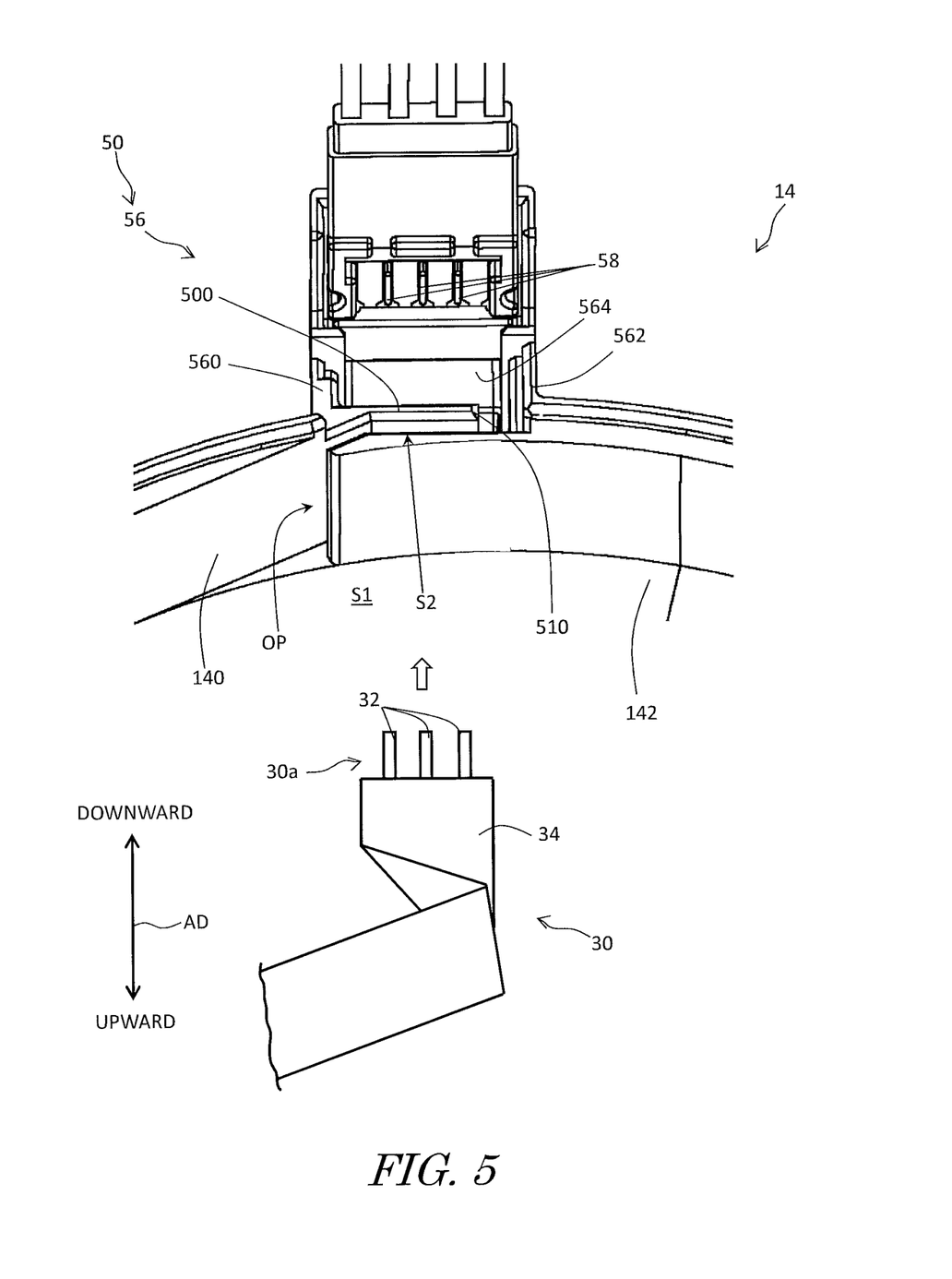
FIG. 5 is a perspective view of the second fixed body portion for illustrating the arrangement of the cable.
Figure 6:
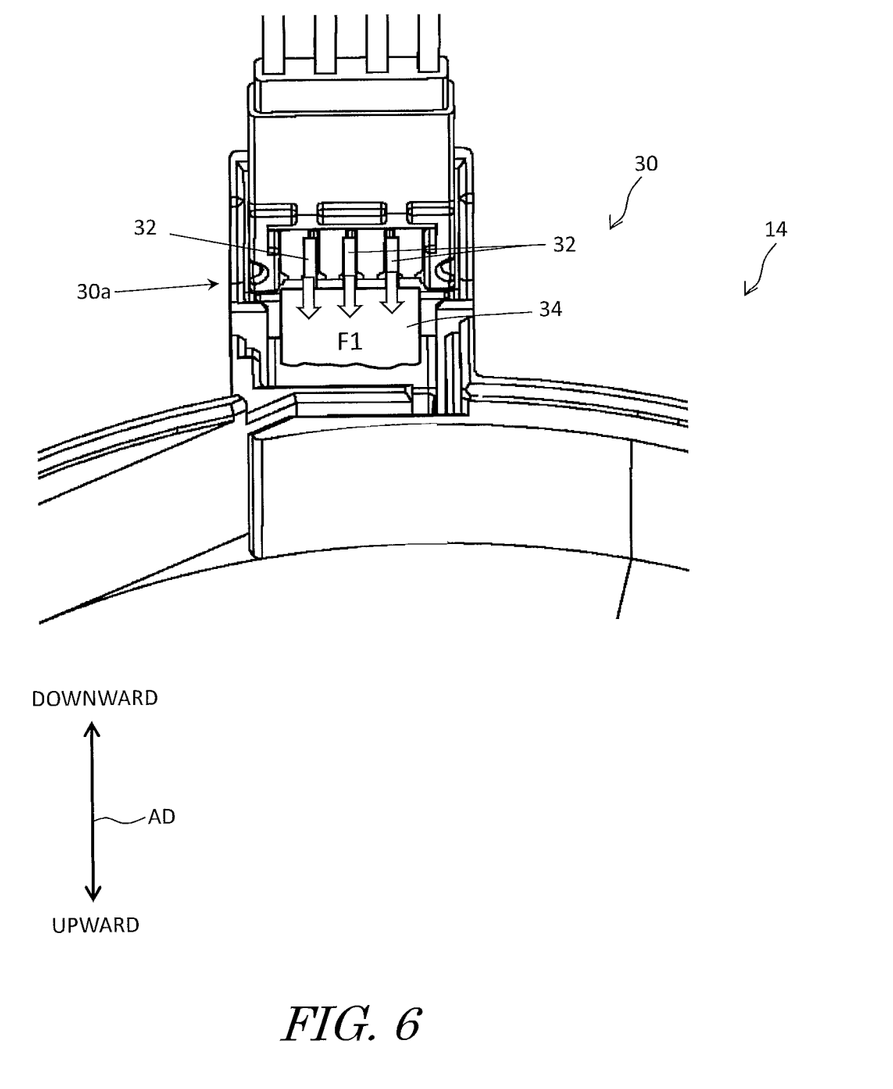
FIG. 6 is a perspective view of the second fixed body portion for illustrating a tensile load applied to an exposed conductor portion of the cable.
Figure 7:
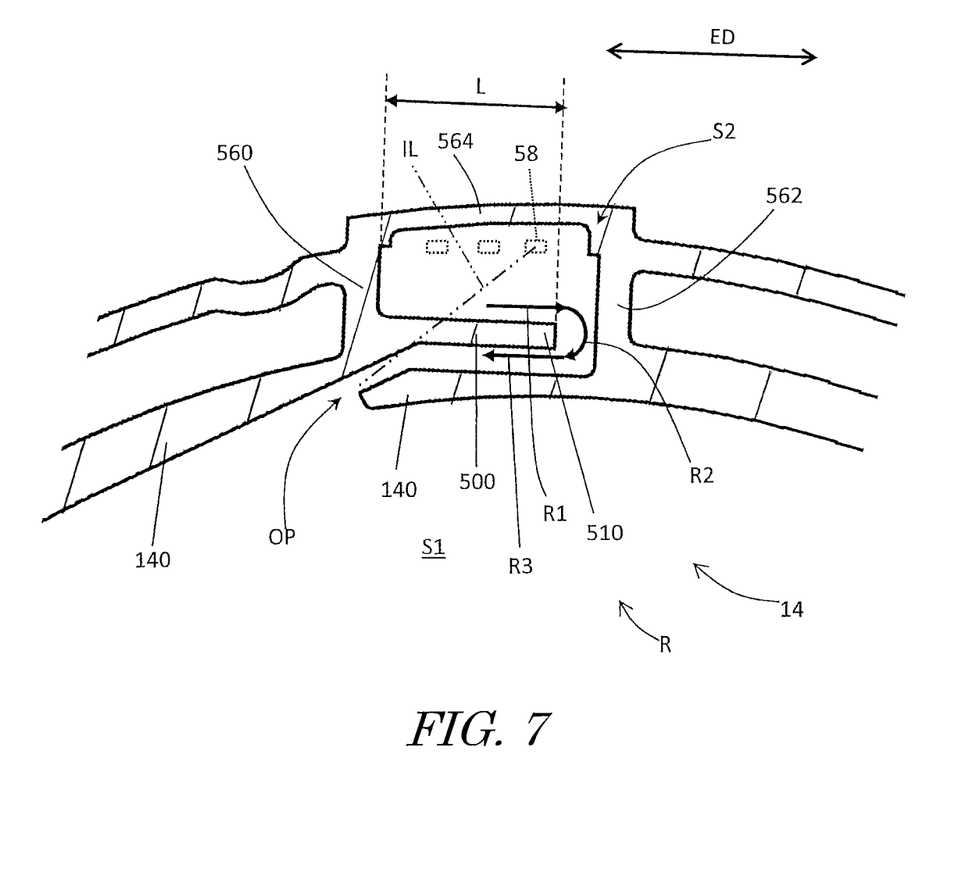
FIG. 7 is a cross-sectional view of the second fixed body portion for illustrating the length of a cable cutting member.
Figure 8:
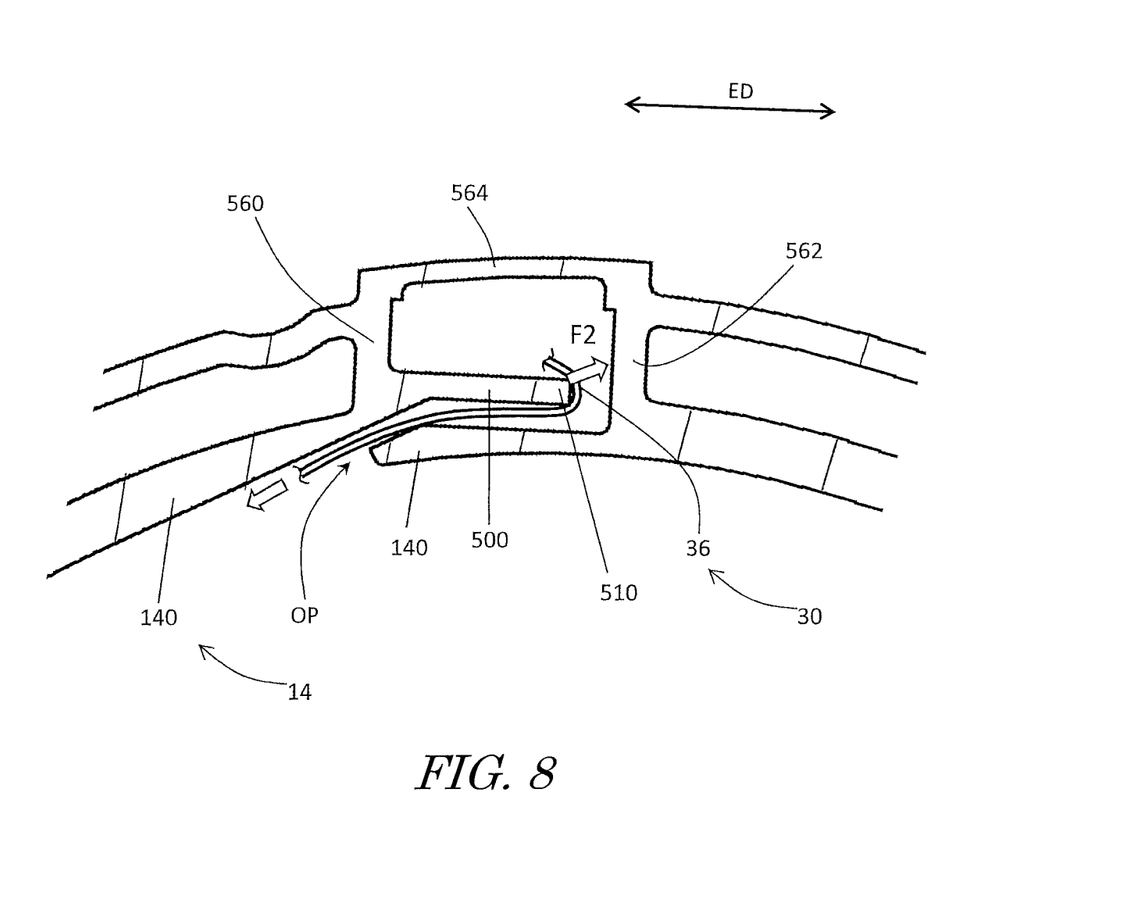
FIG. 8 is a cross-sectional view of the second fixed body portion for illustrating a shearing load applied to a contact portion of the cable.

Next, the arrangement of the cable 30 from the second space S2 to the first space S1 will be described with reference to FIGS. 5 to 8. FIG. 5 is a perspective view of the second fixed body portion 14 for illustrating the arrangement of the cable 30. FIG. 6 is a perspective view of the second fixed body portion 14 for illustrating a tensile load F1 applied to the exposed conductor portion 32 of the cable 30. FIG. 7 is a cross-sectional view of the second fixed body portion 14 for illustrating the length of a cable cutting member 500. FIG. 8 is a cross-sectional view of the second fixed body portion 14 for illustrating a shearing load F2 applied to a contact portion 36 of the cable 30. However, FIGS. 7 and 8 are cross-sectional views of the second fixed body portion 14 in a direction orthogonal to the rotation axis AX.

As illustrated in FIGS. 5 and 8, the cable 30 is disposed in the connector 50 and the fixed body 10 so as to extend from the second space S2 to the first space S1 in a bent state. As illustrated in FIGS. 5 and 6, the exposed conductor portion 32 and the electrode 58 are connected to each other in a state where the direction in which the cable 30 at the first end 30a extends and the direction in which the electrode 58 of the connector 50 extends coincide with each other. This connection is realized, for example, by crimping or by bonding via solder. However, in the example illustrated in FIG. 5, the direction in which the electrode 58 extends is along the axial direction AD, but is not limited thereto.

As illustrated in FIGS. 5 to 8, the connector 50 includes the cable cutting member 500 in the second space S2 in order to cut the cable 30 in the second space S2. The cable cutting member 500 is covered by the second cover portion 56. More specifically, the second cover portion 56 includes a first wall 560, a second wall 562, and a third wall 564. The first wall 560 extends outward from the outer-circumferential cylindrical portion 140 in a direction orthogonal to the rotation axis AX. The second wall 562 extends outward from the outer-circumferential cylindrical portion 140 in a direction orthogonal to the rotation axis AX. The third wall 564 extends in the circumferential direction of the rotation axis AX and connects the first wall 560 and the second wall 562. As a result, a space surrounded by the outer-circumferential cylindrical portion 140, the first wall 560, the second wall 562, and the third wall 564 is formed. This space is a part of the second space S2. The outer-circumferential cylindrical portion 140 may also be referred to as a wall portion 140. The wall portion 140 is spaced apart from the cable cutting member 500. The wall portion 140 is disposed radially inward of the cable cutting member 500 with respect to the rotation axis AX.

As illustrated in FIGS. 5 to 8, the cable cutting member 500 has a wall shape extending along the axial direction AD. The cable cutting member 500 extends from the first wall 560 in an extending direction ED (see FIG. 7) along the circumferential direction of the rotation axis AX. However, the cable cutting member 500 does not reach the second wall 562 in the extending direction ED in order to provide a routing path R of the cable 30. Further, the extending direction ED is along a direction opposite to a tension direction in which the cable 30 is pulled from the second space S2 to the first space S1 due to the rotation of the rotation body 20. In this way, by providing the extending direction ED in which the cable cutting member 500 extends, the shearing load F2 described later can be increased.

A length L of the cable cutting member 500 in the extending direction ED is set such that a tip 510 of the cable cutting member 500 in the extending direction ED comes into contact with the cable 30 when the cable 30 is pulled due to the rotation of the rotation body 20. For example, as illustrated in FIG. 7, the length L of the cable cutting member 500 is provided such that the cable cutting member 500 intersects an imaginary line IL. However, the imaginary line IL connects the electrode 58 of the connector 50 and an opening OP. The opening OP is provided in the outer-circumferential cylindrical portion 140 and opens the second space S2 to the first space S1. The length L is preferably as large as possible in order to increase the shearing load F2 described later.

For example, the length L is ¼ or more of the length of the third wall 564 in the extending direction ED. For example, the length L is equal to or greater than the length of the first wall 560 in the radial direction of the rotation axis AX. However, the length L is not limited thereto.

As illustrated in FIG. 7, the routing path R includes a path R1, a path R2, and a path R3. The path R1 extends from the first wall 560 toward the tip 510 of the cable cutting member 500 in the extending direction ED. The path R1 is provided between the cable cutting member 500 and the third wall 564 in the radial direction of the rotation axis AX. The path R2 extends around the tip 510 of the cable cutting member 500 in the extending direction ED. The path R2 is provided between the tip 510 and the second wall 562 in the extending direction ED. The path R3 extends from the tip 510 toward the first wall 560 in a direction opposite to the extending direction ED. The path R3 is provided between the outer-circumferential cylindrical portion 140 and the cable cutting member 500 in the radial direction of the rotation axis AX. That is, at least a part of the routing path R is provided between the cable cutting member 500 and the wall portion 140.

As illustrated in FIG. 5, the cable 30 is disposed in the second space S2 in a state of being folded twice so as to be along the routing path R. To be specific, in the second space S2, the cable 30 extends upward from the first end 30a along the axial direction AD, extends along the extending direction ED, is folded at the tip 510, and extends in a direction opposite to the extending direction ED. However, it is not essential that the cable 30 be folded, and the cable 30 may be bent only twice in order to follow the routing path R. The cable 30 passes through the opening OP and extends from the second space S2 to the first space S1. Then, the cable 30 passes through an opening provided in the inner-circumferential cylindrical portion 210, and the second end 30b is connected to the connector 60.

When the rotation body 20 rotates by a limited rotation angle or more with respect to the fixed body 10, the cable 30 is excessively pulled. In the present embodiment, the cable 30 is configured to be cut by the cable cutting member 500 before the exposed conductor portion 32 connected to the electrode 58 is disconnected (so as not to be disconnected) when the cable 30 is excessively pulled due to the rotation of the rotation body 20.

More specifically, when the cable 30 is pulled, as illustrated in FIG. 6, the tensile load F1 is applied upward to the exposed conductor portion 32 of the cable 30 at the first end 30a along the axial direction AD. As illustrated in FIG. 8, the contact portion 36 of the cable 30 contacts the tip 510 in the second space S2, and the shearing load F2 is applied to the contact portion 36 in a direction opposite to the tension direction. In the present embodiment, the tensile load F1 for removing the exposed conductor portion 32 from the electrode 58 is larger than the shearing load F2 for cutting the cable 30 at the contact portion 36. The cable cutting member 500 is provided so that the cable 30 is accommodated in the second space S2 in a bent state.

In the present embodiment, three exposed conductor portions 32 are connected to three electrodes 58. Therefore, the tensile load F1 is three times the value of the tensile load for removing one exposed conductor portion 32 from one electrode 58.

When the cable 30 is excessively pulled due to the rotation of the rotation body 20, the cable 30 is cut at the contact portion 36 without disconnecting the exposed conductor portion 32 connected to the electrode 58. Thereby, in the second space S2, the exposed conductor portion 32 exposed from the covering member 34 at the first end 30a is suppressed, for example, from coming into contact with an electrode other than the electrode 58. In addition, for example, the exposed conductor portion 32 exposed from the covering member 34 at the first end 30a is suppressed from being short-circuited to a conductor of a cable other than the cable 30.

Further, since it is only necessary to adjust the tensile load F1 and the shearing load F2, the cable 30 can be cut at the contact portion 36 with a simple structure. However, the structure of the cable cutting member 500 for cutting the cable 30 is not limited to that illustrated in FIGS. 5 to 8.

Modified Example of Cable Cutting Member

Figure 9:
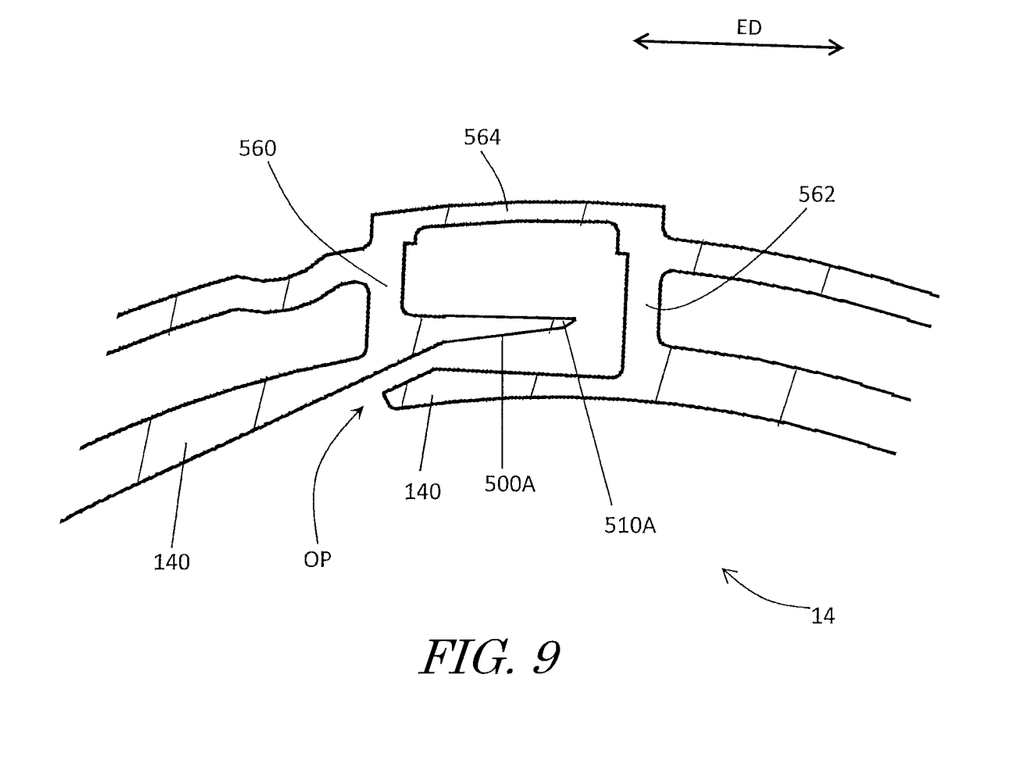
FIG. 9 is a cross-sectional view of the second fixed body portion for illustrating a cable cutting member according to a modified example of the cable cutting member.

FIG. 9 is a cross-sectional view of the second fixed body portion 14 for illustrating a cable cutting member 500A according to a modified example of the cable cutting member 500. The cable cutting member 500A has an acute-angled tip 510A in the extending direction ED. Therefore, the cable 30 is easily cut at the contact portion 36.

Modified Example of Cable

Figure 10:
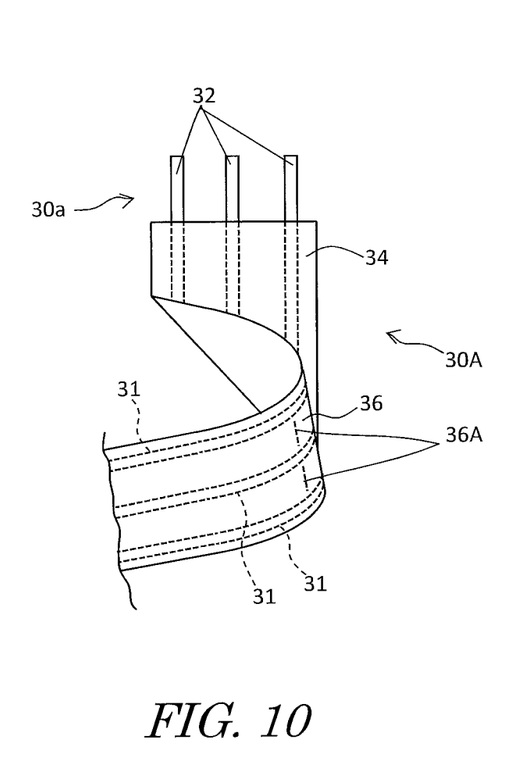
FIG. 10 is a diagram illustrating a configuration of a cable according to a modified example of the cable.

FIG. 10 is a diagram illustrating a configuration of a cable 30A according to a modified example of the cable 30. As illustrated in FIG. 10, the cable 30A differs from the cable 30 illustrated in FIG. 4 in that it has a notch 36A at the contact portion 36.

As illustrated in FIG. 10, the notch 36A cuts the covering member 34 in the thickness direction of the cable 30A. In the example illustrated in FIG. 10, a plurality of notches 36A are provided along a width direction WD of the cable 30A. Note that the thickness direction of the cable 30A is a direction orthogonal to a flat surface of the cable 30A. The width direction WD of the cable 30A is a direction orthogonal to the direction in which the cable 30A extends and to the thickness direction of the cable 30A. As illustrated in FIG. 10, the plurality of notches 36A are provided so as to avoid the plurality of conductors 31.

Since the cable 30A is provided with the plurality of notches 36A, the cable 30A is easily cut by the cable cutting member 500 at the contact portion 36.

It should be noted that, in the present application, "comprise" and its derivatives are non-limiting terms describing the presence of a component and do not exclude the presence of other components not described. This also applies to "have", "include" and their derivatives.

In the present application, a number such as "first" or "second" is merely a term for identifying a configuration, and does not have any other meaning (e.g., a particular order, or the like). The presence of, for example, a "first element" does not imply that a "second element" exists, and the presence of a "second element" does not imply that a "first element" exists.

Expressions such as "parallel", "orthogonal", and "identical" in the present disclosure should not be interpreted strictly and include respectively the meanings of "substantially parallel", "substantially orthogonal", and "substantially identical". Further, representations of other arrangements are not to be strictly interpreted.

The expression "at least one of A and B" in the present disclosure includes any of the following three cases. (i) includes only A, (ii) includes only B, and (iii) includes both A and B.

Various alterations and modifications of the disclosure are apparent from the foregoing disclosure. Accordingly, the disclosure may be implemented in a manner different from the specific disclosure of the present application without departing from the spirit of the disclosure.

What is claimed is:

1. A rotary connector device comprising:
a fixed body;
a rotation body rotatable about a rotation axis with respect to the fixed body, the rotation body being assembled to the fixed body in a manner to form a first space between the rotation body and the fixed body; and
a connector coupled to the fixed body and including a second space and a cable cutting member in the second space which is in communication with the first space;
an electrode which is provided in the second space of the connector and to which an exposed conductor portion provided at one end of a cable is connected, the cable extending from the second space to the first space, the other end of the cable being connected to the rotation body; and
the cable cutting member being configured to cut the cable before the exposed conductor portion connected to the electrode of the connector is disconnected when the cable is pulled due to rotation of the rotation body.

2. The rotary connector device according to claim 1, wherein
the cable cutting member is configured to come into contact with a contact portion other than the exposed conductor portion of the cable, and
a tensile load that is applied to the exposed conductor portion to disconnect the exposed conductor portion in the connector is larger than a shearing load that is applied to the contact portion for the cable cutting member to cut the cable at the contact portion.

3. The rotary connector device according to claim 1, further comprising
the cable comprising a contact portion that comes into contact with the cable cutting member when the cable is pulled due to rotation of the rotation body, wherein
the contact portion is provided with a notch.

4. The rotary connector device according to claim 1, wherein
the cable cutting member is provided such that the cable is accommodated in a bent state in the second space.

5. The rotary connector device according to claim 1, wherein
the connector is coupled to the fixed body in a direction substantially orthogonal to the rotation axis,
a tension direction in which the cable is pulled is along a circumferential direction of the rotation axis,
the cable cutting member has a wall shape extending along an opposite direction to the tension direction, and when the cable is pulled in the tension direction, the cable cutting member comes into contact with the contact portion other than the exposed conductor portion of the cable, at a tip of the cable cutting member in the opposite direction.

6. The rotary connector device according to claim 5, wherein
the tip of the cable cutting member in the opposite direction has an acute-angled shape in a cross-section orthogonal to the rotation axis.

7. The rotary connector device according to claim 1, wherein
the fixed body comprises a wall portion disposed at a distance from the cable cutting member.

8. The rotary connector device according to claim 7, wherein
the fixed body has a routing path in which the cable is provided, and
at least a part of the routing path is provided between the cable cutting member and the wall portion.

9. The rotary connector device according to claim 7, wherein
the wall portion is disposed radially inward of the cable cutting member with respect to the rotation axis.

* * * * *